United States Patent
Seider et al.

[11] 4,035,709
[45] July 12, 1977

[54] BATTERY CHARGING SYSTEM

[75] Inventors: Gene J. Seider, Bloomington; Michael C. Freund, Mendota Heights, both of Minn.

[73] Assignee: Gould Inc., Rolling Meadows, Ill.

[21] Appl. No.: 573,080

[22] Filed: Apr. 30, 1975

[51] Int. Cl.² .................................... H02J 7/04
[52] U.S. Cl. ............................. 320/23; 320/31; 320/37; 320/39
[58] Field of Search .............. 320/23, 24, 30, 31, 320/37, 38, 39, 40, 22

[56] References Cited

U.S. PATENT DOCUMENTS

| | | | |
|---|---|---|---|
| 2,635,689 | 4/1953 | Hall | 320/23 X |
| 3,178,629 | 4/1965 | Saslow | 320/30 X |

*Primary Examiner*—Robert J. Hickey
*Attorney, Agent, or Firm*—Leydig, Voit, Osann, Mayer & Holt, Ltd.

[57] ABSTRACT

A battery charging system for charging a battery from a conventional a.c. power source has a leakage reactance transformer connected between the power source and the battery for reducing the voltage of the power source for application to the battery. The power source is connected directly across the primary winding of the transformer to charge the battery at a high rate until it is charged to about 90% of the final capacity. A voltage sensing circuit is activated when the battery reaches about 80% of the desired final voltage, and this circuit energizes a timing motor which maintains the connection of the source directly across the primary winding of the transformer for a period of one hour, which is the normal time required for the battery charge to be increased from the 80% level to the 90% level. At the end of the 1 hour period, a cam driven by the timing motor operates a switch to connect a resistor, which is external of the transformer, in series with the primary winding of the transformer. This sharply reduces the charging current and the charging of the battery is completed at relatively low current levels which vary over a very narrow range. This "finish" charging is continued for a 6 hour period determined by the timing motor. At the end of the 6 hour period, additional cams driven by the timing motor disconnect the power source from the transformer to terminate the charging cycle, and de-energize the timing motor. The system is automatically reset for the next charging cycle.

8 Claims, 4 Drawing Figures

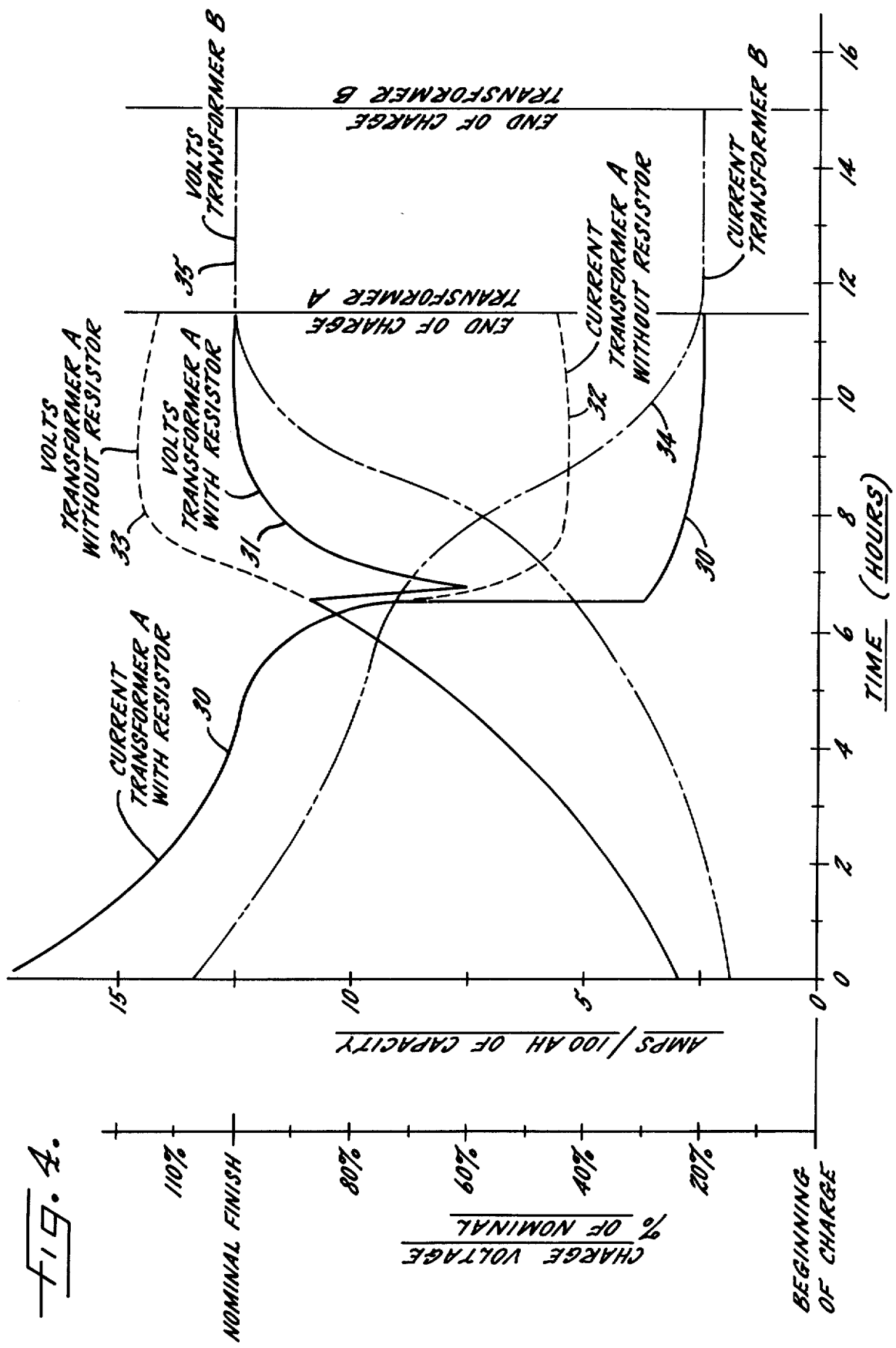

BATTERY CHARGING SYSTEM

DESCRIPTION OF THE INVENTION

The present invention relates generally to battery charging systems and, more particularly, to an improved battery charging system that is completely automatic.

It is a primary object of the present invention to provide an improved battery charging system which is relatively simple and inexpensive and yet produces a full battery charge in a relatively short time. A related object is to provide such a system which is completely automatic in its operation from the time the system is first connected to a conventional a-c power source.

It is another important object of the invention to provide an improved battery charging system of the foregoing type which does not involve any costly or complex electronic circuits, and yet still achieves a rapid charge.

A further important object of the invention is to provide such an improved battery charging system which is just as effective for charging low voltage batteries as it is for high voltage batteries.

Another object of the invention is to provide such an improved battery charging system which produces a finish charging current that is sufficiently low to avoid excessive gassing and excessive temperatures within the battery.

Still another object of the invention is to provide such an improved battery charging system which produces a substantially constant finish charging current so that the desired final charge is achieved, and at the desired level of finish charging current, regardless of the age or temperature of the battery being charged.

A still further object of the invention is to provide such an improved battery charging system which avoids excessive transformer temperatures.

Yet another object of the invention is to provide such an improved battery charging system which provides a high degree of safety and reliability in operation.

Other objects and advantages of the invention will be apparent from the following detailed description together with the accompanying drawings, in which:

FIG. 4 is a graph illustrating the charging currents and charge voltages produced by the system of FIGS. 1 and 2 in comparison with certain other hypothetical battery charging systems.

While the invention will be described in connection with certain preferred embodiments, it will be understood that it is not intended to limit the invention to those particular embodiments. On the contrary, it is intended to cover all alternatives, modifications, and equivalents as may be included within the spirit and scope of the invention as defined by the appended claims.

Figure 1:
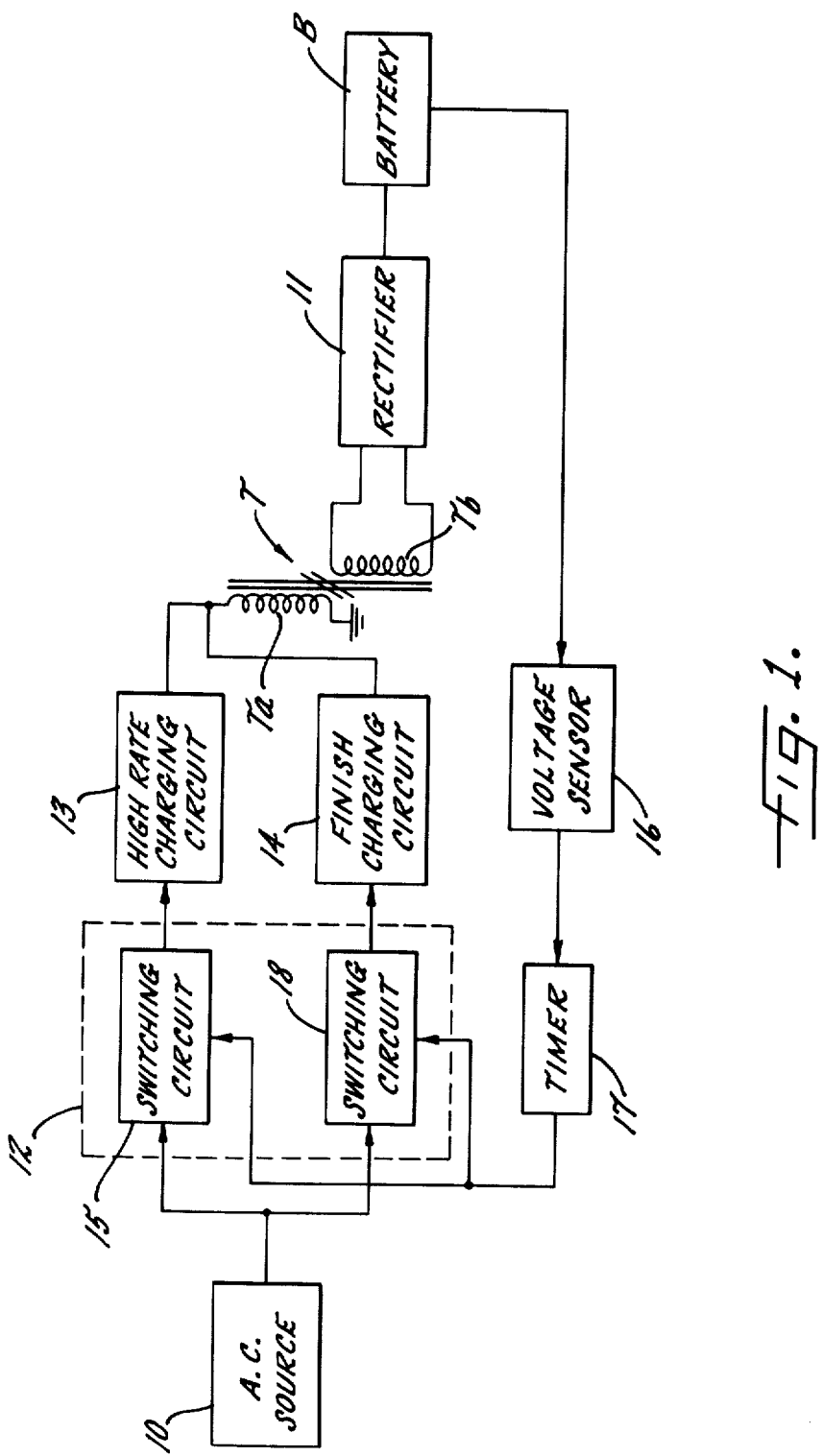
FIG. 1 is a block diagram of a battery charging system embodying the invention.

Turning now to the drawings, in FIG. 1 there is illustrated a system for charging a battery B from a conventional 110-volt, 60-cycle a-c source 10. The illustrative system is particularly useful for overnight charging of a 12-volt battery in an electric vehicle, although it will be understood that there are many other possible applications for the charging system. The charging of the battery B is effected via a transformer T which has its primary winding Ta connected across the a-c source 10 and its secondary winding Tb connected across the battery B. To rectify the a-c signal produced in the secondary winding Tb, a full wave rectifier 11 is connected between the winding Tb and the battery B.

In accordance with one important aspect of the present invention, the transformer is a leakage reactance transformer and in circuit with the transformer for initially charging the battery at relatively high current levels to achieve a relatively fast charging rate; means for automatically connecting an additional impedance, external of the transformer, in circuit with the transformer after the battery has been charged to a predetermined voltage, whereby the charging current is sharply reduced and the charging of the battery is completed at relatively low current levels which vary over a very narrow range; and means for terminating the charging of the battery at the end of a predetermined time period following the sharp reduction in the charging current. Thus, in the illustrative system of FIG. 1, the transformer T is a leakage reactance transformer, and the a-c power source 10 is connected to the primary transformer winding Ta through a switching network 12 and either a high rate charging circuit 13 or a finish rate charging circuit 14. When the a-c source 10 is connected to the charging system, a switching circuit 15 within the switching network 12 immediately connects the power source 10 to the rapid charging circuit 13. This circuit 13 applies a relatively high voltage across the primary transformer winding Ta so as to produce a relatively high charging current in the secondary winding Tb and thereby charge the battery at a relatively rapid rate during the initial portion of the charging cycle.

When the battery B has been charged to a predetermined voltage, e.g., a voltage representing 80% of the desired final charge, a voltage sensor 16 activates a timer 17 which measures a predetermined time interval and then actuates the switching circuits 15 and a second switching circuit 18 in the switching network 12 to de-energize the rapid charging circuit 13 and energize the finish charging circuit 14. The time interval between activation of the timer 17 and energization of the finish charging circuit 14 is preferably long enough to bring the battery charge up to about 90% of the desired final charge. The voltage sensor 16 is connected across the battery B so that it continuously monitors the battery charge. When the finish charging circuit 14 is energized, it automatically connects an additional impedance, external of the transformer, in circuit with the transformer and the battery to sharply reduce the voltage across the primary transformer winding Ta, thereby sharply reducing the charging current in the secondary winding Tb. The charging of the battery is then completed at relatively low current levels that vary over only a very narrow range, so that there is no danger of overcharging or damaging the battery by overheating.

After the finish charging circuit 14 has been energized, the timer 17 continues to measure a second predetermined time interval, e.g., 6 hours, at the end of which the finish charging circuit 14 is automatically de-energized. This second predetermined time period is selected to provide the battery B with the desired full charge, taking into account the battery characteristics and the fact that the battery has been previously charged to about 90% of the desired final charge. When the finish charging circuit 14 is de-energized, the switching network 12 is also reset so that it is ready for another charging cycle.

This system permits the battery to be charged in a relatively short cycle time while using relatively simple and inexpensive components. Comparable results have been achieved in previous charging systems only through the use of complex and costly electronic circuitry. As will be seen from the following detailed example, the system of the present invention can be implemented primarily through the use of inexpensive relays and cam-operated switches, so that the manufacturing cost is relatively low.

Figure 2:
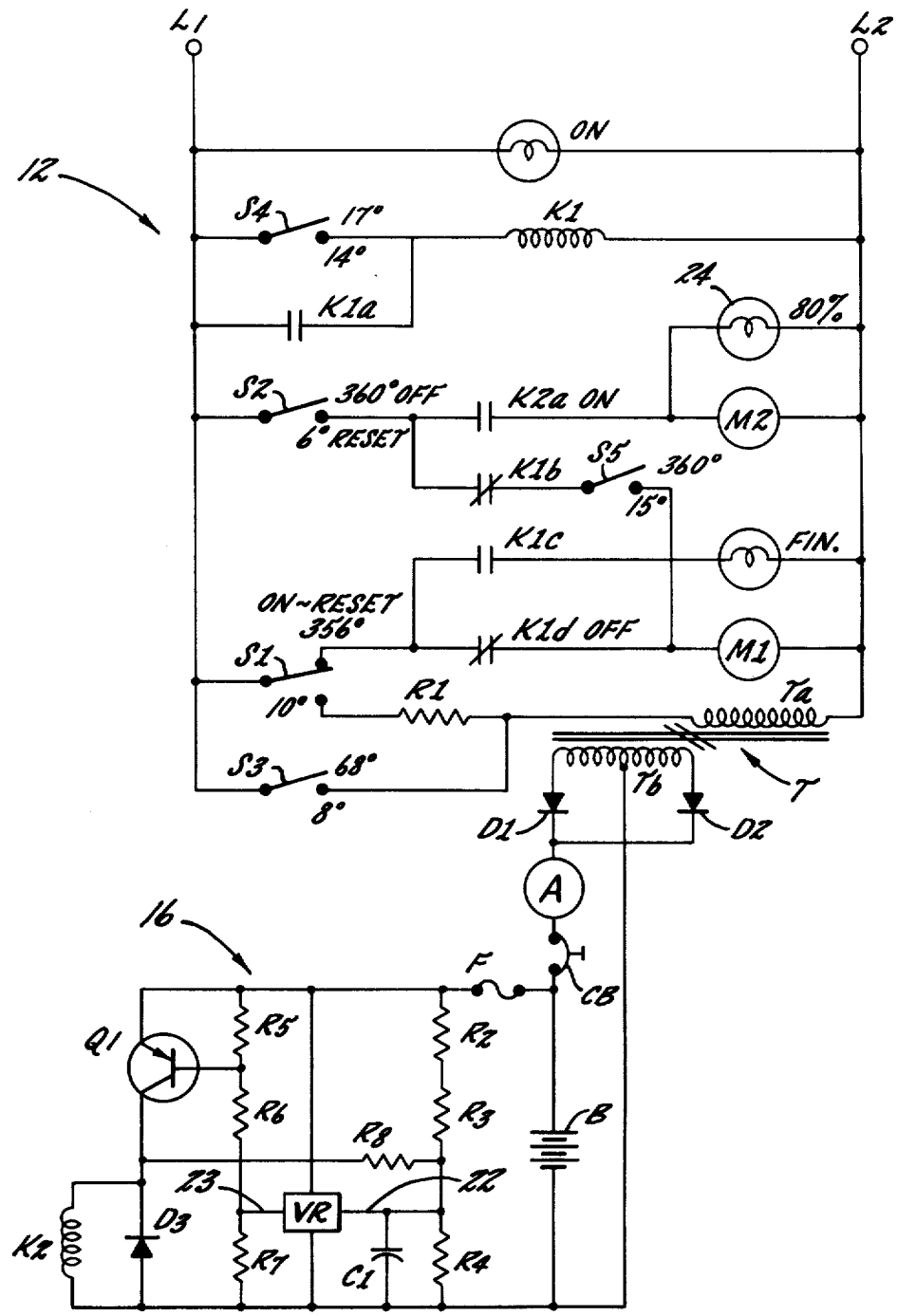
FIG. 2 is a schematic circuit diagram of an exemplary battery charging system embodying the invention and corresponding to the block diagram of FIG. 1.

In FIG. 2, an exemplary embodiment of the charging system illustrated generally in FIG. 1 is shown in more detail. A conventional 110-volt, 60-cycle a-c source is connected across a pair of lines L1 and L2 to immediately energize an "ON" light 21 to provide a visible indication that the charging system has been rendered operative. A high speed motor M1 in a switching network 12 is also immediately energized via a cam-operated switch S1 and a pair of normally closed relay contacts K1s. This high speed motor M1 drives a series of cams which operate the switch S1 plus four additional switches S2, S3, S4 and S5. After the first 6° of revolution, one of the cams opens the switch S2 to enable the energization circuit for a slower speed timing motor M2 which drives all the same cams driven by the high speed motor M1. The motor M2 is not actually energized at this point because a pair of normally open relay contacts K2a are also included in the energizing circuit for this motor.

When the motor M1 drives the cams through 8° of revolution, one of the cams closes the switch S3 to connect the a-c source directly across the primary winding Ta of the transformer T, thereby forming a rapid charging circuit which applies a relatively high voltage across the primary winding Ta. This produces a relatively high charging current in the secondary transformer winding Tb to charge the battery B at a relatively fast rate during the initial stage of the charging cycle. To rectify the a-c signal produced in the secondary winding Tb, a pair of diodes D1 and D2 form a full wave rectifier between the ends of the winding Tb and the positive terminal of the battery B. The negative battery terminal is connected directly to a center tap on the secondary winding Tb. A circuit breaker CB protects the battery B from excessive currents, and an ammeter A provides a continuous indication of the magnitude of the charging current.

After the high speed motor M1 has driven the cams through 10° of revolution, one of the cams throws the switch S1 from its upper position to its lower position, thereby de-energizing the high speed motor M1 and enabling but not energizing) the finish charging circuit which will be described in more detail below. At this point the switching network is in a static condition, with all the cams remaining stationary at the 10° position because both the motors M1 and M2 are de-energized. During this static condition of the switching network, the high voltage is applied continuously to the primary transformer winding Ta, but the charging current in the secondary winding Tb is limited by the inductance of the transformer and gradually decreases because of the increasing impedance produced by the charging battery B.

When the battery has charged to a predetermined voltage, preferably a voltage which is about 80% of the desired full battery charge, a voltage regulator VR (e.g., a Motorola MFC 4060 integrated circuit) responds to this level of battery voltage to produce an output signal which renders a transistor Q1 conductive. The voltage regulator is part of a voltage sensing circuit 16 which includes resistors R2, R3 and R4 forming a voltage divider across the battery B. A fuse F protects the voltage sensing circuit from excessive currents. At the beginning of a charging cycle, the voltage on the input line 22 of VR is below the internal reference of VR (e.g., 4 volts), and the voltage on the output line 23 of VR is relatively high (e.g., 12 volts). When the battery B has been charged to about the 80% level (e.g., 14 volts for a nominal 12-volt battery with a desired full charge of 16 volts), the voltage on the VR input line 22 goes above the internal reference voltage of VR, thereby producing a relatively low voltage on the VR output line 23. This causes current to flow through the resistors R5, R6 and R7, thereby rendering the transistor Q1 conductive and energizing a relay K2. A diode D3 connected across the coil of relay K2 protects the transistor Q from the inductive voltage of K2. A portion of the current flowing through Q1 passes through a resistor R8 to provide positive feedback to ensure that the voltage on the VR input line 22 remains above the internal reference voltage so that Q1 remains conductive despite fluctuations in the battery voltage due to fluctuations in the a-c line voltage. A capacitor C1 connected from the VR line 22 to ground reduces ripples in the input voltage to the voltage regulator VR.

Energization of the relay K2 closes the relay contacts K2a to energize the timing motor M2 via the previously closed switch S2. Simultaneously with the energization of M2, an "80%" indicator light 24 is illuminated to provide a visible indication that the battery B has been charged to approximately 80% of the desired final charge. The timing motor M2 then resumes the driving of the cams associated with the switches S1–S5, the effect of which is to measure the two predetermined time intervals mentioned above in connection with FIG. 1. In the illustrative example, it will be assumed that the motor M2 drives the cams at a rate of 1° per minute.

It will be recalled that the high speed motor M1 was de-energized by switch S1 at the 10° position, so all the cams associated with the switches S1–S5 remained at the 10° position until the motor M2 was energized. After the timing motor M2 is energized, the first switch that it operates is S4, which is closed when the cams are rotated to the 14° position. The closing of S4 energizes a relay K1 which locks itself in through a pair of normally open contacts K1a connected in parallel with the switch S4. Three degrees later, at the 17° cam position, one of the cams resets the switch S4 to its original open position, but of course the relay K1 remains energized via the contacts K1a.

At the 15° cam position, i.e., after the switch S4 is closed, one of the cams closes the switch S5 to enable the high speed motor M1 for re-energization in the event that the relay K1 does not become energized and remain energized during the balance of the charging cycle. If relay K1 is energized and locked in as it should be at the 14° position, it opens a pair of normally closed contacts K1b connected in series with the switch S5. Consequently, the closing of the switch S5 will have no effect. However, if the relay K1 fails to become energized, or if it becomes de-energized at any time during the remainder of the charging cycle, due to disconnection of the a-c supply for example, the contacts K1b will be closed to energize the high speed motor M1 via S2 and S5. The motor M1 will then remain energized until the cams have returned to the 10° position at which the motor M1 is normally de-energized, thereby rapidly resetting the entire system to the static condition that prevails until M2 is energized. At the 360° cam position, switches S2 and S5 are opened, but the switch S1 is reset at the 356° position so that the motor M1 remains energized via S1 and normally closed contacts K1d until S1 is re-actuated at the 10° position. Of course, upon resetting of the system, the timing motor M2 is promptly re-energized via switch S2 and contacts K2a (K2 remains energized as long as the battery voltage is above the 80% level) so that the relay K1 is again energized at the 14° cam position.

In addition to the closing of contacts K1a and the opening of contacts K1b, the relay K1 (1) closes a pair of contacts K1c to enable the energization of a FINISH light 25 when switch S1 is reset at the 356° cam position and (2) opens a pair of contacts K1d to prevent the energization of the high speed motor M1 through its normal energization circuit until K1 has been de-energized. In normal operation, de-energization of K1 occurs at the end of the charging cycle when the a-c supply is disconnected from the charging system.

The first predetermined time interval measured by the timing motor M2 is approximately 1 hour, i.e., from the 10° cam position at which M2 is energized to the 68° cam position at which the switch S3 is opened. The opening of this switch S3 effects the changeover from the rapid charging circuit to the finish charging circuit. More specifically, the opening of the switch S3 removes the shunt around S1, so the only connection between the a-c supply and the primary transformer winding Ta is via S1 and a resistor R1, thereby placing the resistor R1 in series with the primary winding Ta. This sharply reduces the voltage across the transformer, resulting in a correspondingly sharp reduction in the charging current supplied to the battery B.

The second predetermined time interval measured by the timing motor M2 is approximately 5 hours, i.e., from the 68° cam position at which the switch S3 is opened to the 360° cam position at which the switch S2 is opened to de-energized the motor M2. The switch S5 is also opened at the 360° position because there is no longer any need for the safeguard of a high speed reset in the event of disconnection of the a-c supply or any other problem resulting in de-energization of the relay K1. As mentioned previously, the switch S1 is reset at the 356° cam position to enable the high speed motor M1 for re-energization at the start of the next charging cycle. Thus, by the time the cams are returned to the 360° positions by the timing motor M2, the entire system is reset for the start of another charging cycle.

The system is designed to effect the sharp reduction in the charging current at about the 90% charge level (typically 1 hour beyond the 80% charge level) because that is about the point at which the battery impedance begins to change at a rapid rate due to the conversion of water within the battery to gaseous hydrogen and oxygen. The charge voltage tends to increase rapidly at this point when an increasing percentage of the energy entering the battery is going into the gas phase. This final portion of the charging cycle is commonly referred to as the finishing charge, and is generally considered to begin when the battery reaches about 90% of its final charge. It is generally accepted that the current level during the finishing charge should be about 5% of the 6-hour capacity of the battery in its fully charged condition, e.g., about 9 amps for a battery with capacity of 180 ampere-hours in its fully charged condition, in order to avoid the deleterious effects of overcharging.

As is well known in the battery charging art, a substantially constant finish charging current is desirable because it avoids overcharging or undercharging due to variations in the charging characteristics of batteries caused by the effects of a battery age and temperature. A new and/or cold battery generally presents a much higher impedance, and draws lower charging currents, than an old and/or warm battery. Thus, the greater the range of current values covered by the finish charging portion of the voltage-current or "VI" curve, the greater the possibility of overcharging or undercharging batteries having different charging characteristics. In the VI curve produced by the present invention, the finish charging current typically covers a range of only about 0.5 amps/100 amp-hrs. of capacity, so there obviously is little or no danger of overcharging or undercharging, regardless of the condition of the battery being charged.

Figure 3:
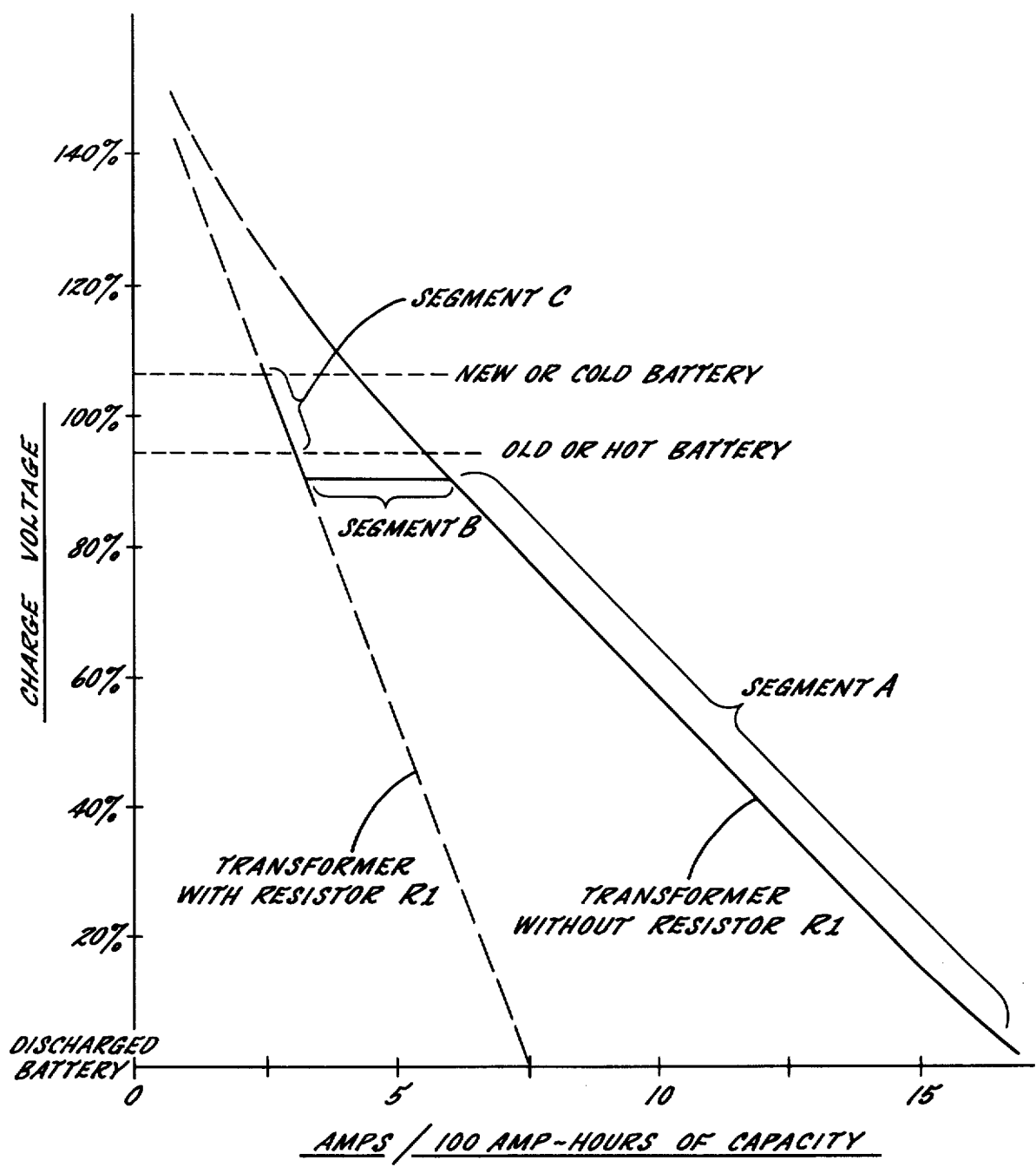
FIG. 3 is a graph illustrating the voltage-current characteristic of the system of FIGS. 1 and 2.

FIG. 3 is a VI curve for the charging system illustrated in FIGS. 1 and 2. As the charge voltage increases from the discharged level to about 90% of the fully charged level, the charging current drops from about 17 amps/100 amp-hrs. of capacity to about 6 amps/100 amp-hrs. of capacity, as indicated by segment A of the curve in FIG. 3. During this portion of the charging cycle, the entire a-c supply voltage is connected across the primary transformer winding Ta, and the transformer is designed to increase the charge voltage at a relatively rapid rate. At about the 90% charge level, the timing motor M2 opens switch S3 so that the resistor R1 is connected in series with the primary winding Ta, thereby sharply dropping the voltage across the transformer and the resultant charging current, as indicated by segment B of the curve of FIG. 3.

This sharp reduction in the charging current permits the use of a transformer which effects a rapid charging rate during the initial portion of the charging period, without producing a final charge which is so high that it damages the battery. Moreover, the finish charging circuit is substantially constant so that the desired final charge is achieved, and at the desired level of finish charging current, regardless of the age or temperature of the battery being charged. This is even true in the case of low voltage batteries where the resistance of the transformer winding has more effect than its inductance, resulting in a substantially linear VI curve; thus, the transformer itself would produce a relatively wide range of charging currents for batteries of different ages and temperatures. With the external resistance R1 connected in series with the transformer, however, the slope of the substantially linear VI curve is increased sufficiently to produce a substantially constant finish charging current, as indicated by segment C of the curve of FIG. 3.

The advantages of the charging system provided by this invention can be seen more clearly from the "chargeback" curves in FIG. 4. There are three pairs of curves included in this figure: (i) the solid line curves 30 and 31 are the chargeback curves produced by the system of this invention using a transformer A; (ii) the dashed line curves 32 and 33 are the chargeback curves that would by produced by the rapid charging circuit alone, without ever connecting the resistance R1 or other external impedance in circuit with the transformer; and (iii) the dot-dash curves 34 and 35 are the chargeback curves that would be produced by the use of a smaller transformer B to achieve the same finish charging current achieved by the invention, again without ever connecting a resistance or other external impedance in circuit with the transformer. With the system of the invention, it can be seen that there is a discontinuity in both the current and voltage curves 30 and 31, caused by the changeover from the rapid charging circuit to the finish charging circuit, in the area where the impedance presented by the charging battery begins to increase at a rapid rate. This is the 90% charge point, and in the illustrative example of FIG. 4 it occurs after about 6.5 hours. The charging current drops sharply, to about 4 amps/100 amp-hrs., when the changeover occurs, and then gradually decreases to a finish charging current of about 2.5 amps/hrs., so there is very little variation in the charging current during the finish portion of the charging cycle. Meanwhile, the charging voltage increases only to the desired nominal finish voltage. Because of the rapid charging rate during the initial 6.5 hours of the cycle, the total charging time is still relatively short, i.e., about 11.5 hours.

If the same battery were charged without switching a resistor or other impedance into circuit with the transformer, the charging voltage would rapidly increase to a level substantially above the desired finish voltage, as illustrated by curve 33. At the same time, the finish charging current would remain at a relatively high level, as illustrated by the curve 32. As a result, the battery would be overcharged, producing excessive temperatures and gassing that could damage the battery.

The chargeback curves 34 and 35 illustrate how the same finish voltage and current achieved with the invention could be achieved with the use of a smaller transformer B without ever switching an external impedance into circuit with the transformer. As can be seen from the curves, the use of the smaller transformer significantly reduces the charging rate during the initial portion of the cycle, and extends the total charging time from 11.5 to 15 hours. This extended charging time would be particularly undesirable in applications where overnight charging is required.

We claim as our invention:

1. A battery charging system for charging a battery from a conventional a-c power source, said system comprising the combination of
   a. a leakage reactance transformer connected between the power source and the battery for reducing the voltage of the power source for application to the battery,
   b. means in circuit with the transformer for initially charging the battery at relatively high current levels to achieve a relatively high charging rate,
   c. means for automatically connecting an additional impedance, external of the transformer, in circuit with the transformer after a first predetermined time interval following the charging of the battery to a predetermined voltage, whereby the charging current is sharply reduced and the charging of the battery is completed at relatively low current levels which vary over a very narrow range,
   d. and means for terminating the charging of the battery at the end of a second predetermined time period following the sharp reduction in the charging current.

2. A battery charging system as set forth in claim 1 wherein said predetermined voltage is about 80% of the final voltage to which it is desired to charge the battery and said first predetermined time interval is about 1 hour.

3. A battery charging system as set forth in claim 1 which includes means for connecting said additional impedance in circuit with the transformer when the battery is charged to about 90% of the final capacity to which it is desired to charge the battery.

4. A battery charging system for charging a battery from a conventional a-c. power source, said system comprising the combination of
   a. a leakage reactance transformer connected between the power source and the battery for reducing the voltage of the power source for application to the battery,
   b. means in circuit with the transformer for initially charging the battery at relatively high current levels to achieve a relatively high charging rate, said initial charging means including
      1. a plurality of cam-operated switches,
      2. a high speed motor for driving the cams that operate said switches,
      3. a low speed driving motor for driving said cams,
      4. a battery charging circuit connected to said transformer,
      5. means for energizing the high speed motor via one of the cam-operated switches in response to the connection of the a-c power source to the battery charging system,
      6. means for energizing the battery charging circuit via one of the cam-operated switches in response to a first predetermined movement of said cams, and
      7. means for de-energizing the high speed motor in response to a second predetermined movement of said cams,
   c. means for automatically connecting an additional impedance, external of the transformer, in circuit with the transformer after a first predetermined time interval following the charging of the battery to a predetermined voltage, said automatic connecting means including
      1. means for energizing the timing motor in response to the charging of the battery to a predetermined voltage, and
      2. means for sharply reducing the charging current in the battery charging circuit in response to a third predetermined movement of said cams whereby the charging of the battery is completed at relatively low current levels over a very narrow range,
   d. and means for terminating the charging of the battery at the end of a second predetermined time period following the sharp reduction in the charging current, said terminating means including
      1. means for de-energizing the battery charging circuit in response to a fourth predetermined movement of said cams,
      2. and means for de-energizing the timing motor in response to a fifth predetermined movement of said cams.

5. A battery charging system as set forth in claim 4 which includes means responsive to disconnection and re-connection of the a-c power source after de-energization of the high speed motor for re-energizing the high speed motor to return the cams to the positions they had when the high speed motor was previously de-energized.

6. A battery charging system as set forth in claim 1 which includes a transformer that is continuously connected between the a-c power source and the battery without any switching between different taps on said transformer.

7. A battery charging system for charging a battery from a conventional a-c power source, said system comprising the combination of
   a. a leakage reactance transformer connected between the power source and the battery for reducing the voltage of the power source for application to the battery,
   b. a plurality of cam-operated switches,
   c. a high charging rate circuit connected to said transformer and enabled by a first one of said cam-operated switches for initially charging the battery at relatively high current levels to achieve a relatively rapid charging rate,
   d. a finish rate charging circuit enabled by a second one of said cam-operated switches for automatically connecting an additional impedance, external of the transformer, in circuit with the transformer after the battery has been charged to a predetermined voltage, whereby the charging current is sharply reduced and the charging of the battery is completed at relatively low current levels which vary over a very narrow range,
   e. a motor driving the cams for operating said switches, and
   f. means responsive to said predetermined voltage for energizing said motor to drive said cams,
      i. the cam for said first switch enabling the high rate charging circuit for a first time interval following energization of the motor and then disabling the high charging rate circuit,
      ii. the cam for said second switch enabling the finish rate charging circuit for a second time interval following disabling of the high charging rate circuit and then disabling the finish rate charging circuit.

8. A method of charging a battery from a conventional a-c power source, said method comprising the steps of
   a. connecting a leakage reactance transformer between the a-c power source and the battery to initially charge the battery at relatively high current levels to achieve a relatively high charge rate,
   b. connecting an additional impedance, external of the transformer, in circuit with the transformer after a first predetermined time interval following the charging of the battery to a predetermined voltage to sharply reduce the charging current and completing the charging of the battery at relatively low current levels which vary over a very narrow range,
   c. and terminating the charging of the battery at the end of a second predetermined time period following the sharp reduction of the charging current.

* * * * *